April 21, 1936. C. L. CREECH, JR Re. 19,940

TABLE

Original Filed April 12, 1932 2 Sheets-Sheet 1

INVENTOR.
CHARLES L. CREECH, JR.

BY
Lockwood Goldsmith & Gatt.
ATTORNEYS.

April 21, 1936. C. L. CREECH, JR Re. 19,940
TABLE
Original Filed April 12, 1932 2 Sheets-Sheet 2
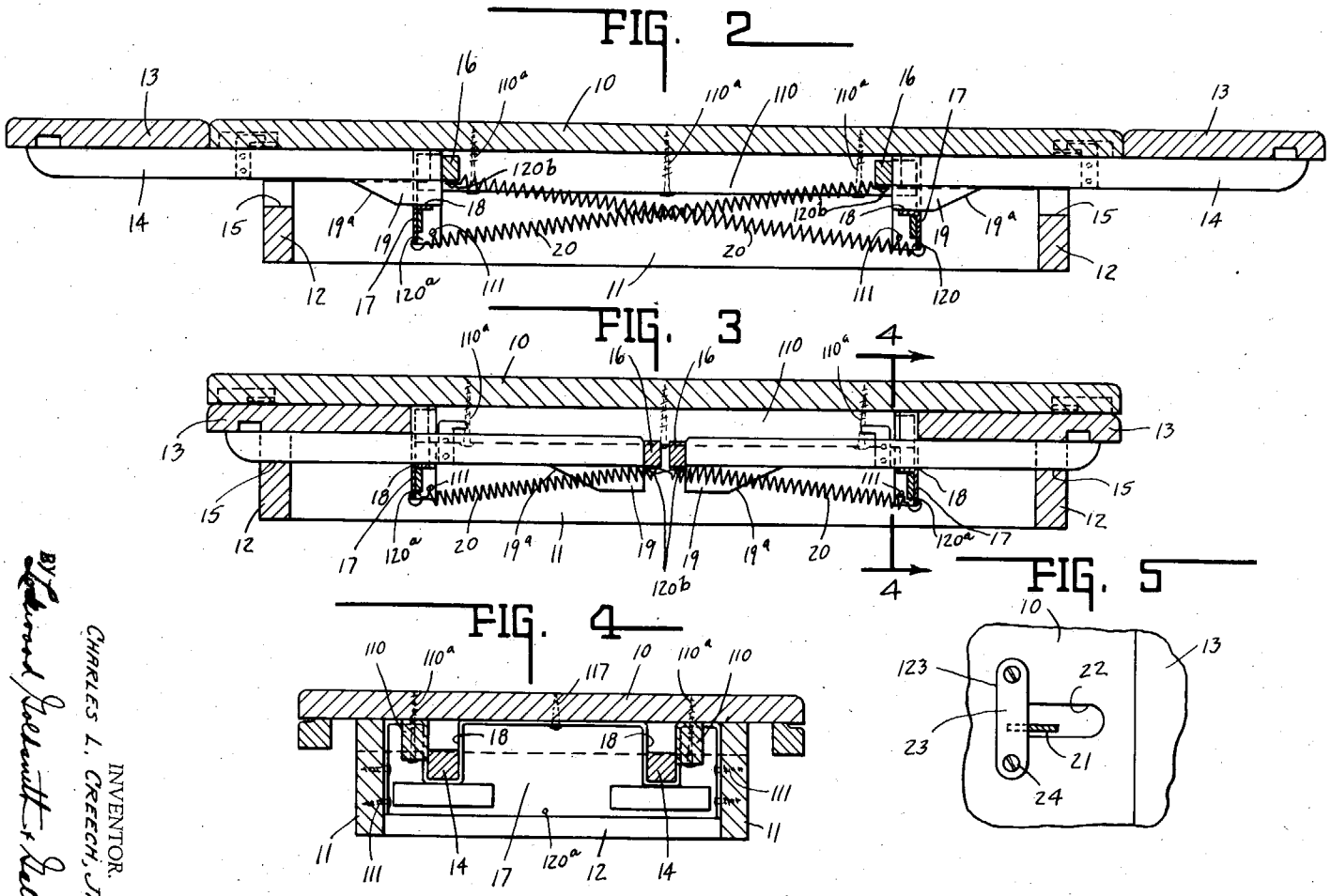
INVENTOR.
CHARLES L. CREECH, JR.
BY Lockwood Goldsmith & Gelt
ATTORNEYS.

Reissued Apr. 21, 1936

Re. 19,940

UNITED STATES PATENT OFFICE 19,940

TABLE

Charles L. Creech, Jr., Winston-Salem, N. C.

Original No. 1,932,883, dated October 31, 1933, Serial No. 604,845, April 12, 1932. Application for reissue September 10, 1934, Serial No. 743,472

14 Claims. (Cl. 311—56)

This invention relates broadly to furniture, and has more particular reference to a table.

In accordance with the present invention an improved extension table, such as a refectory table or the like is provided, the top of the table having extension sections which when not in use are located beneath the fixed or main top section, and which when in use are secured in the same plane with the main top section through the medium of interengaging means carried by the main top section and the extension top section.

The invention together with its numerous objects and advantages will be best understood from a study of the following description, taken in connection with the accompanying drawings wherein:

Figure 2 is a longitudinal sectional view with the top in fully extended position.

Figure 3 is a view similar to Figure 2 with the extension top sections being shown nestingly arranged relative to and beneath the main top section.

Figure 4 is a transverse sectional view taken substantially on the line 4—4 of Figure 3.

Figure 5 is a fragmentary bottom plan sectional view taken substantially on the line 5—5 of Figure 6.

Figure 1:
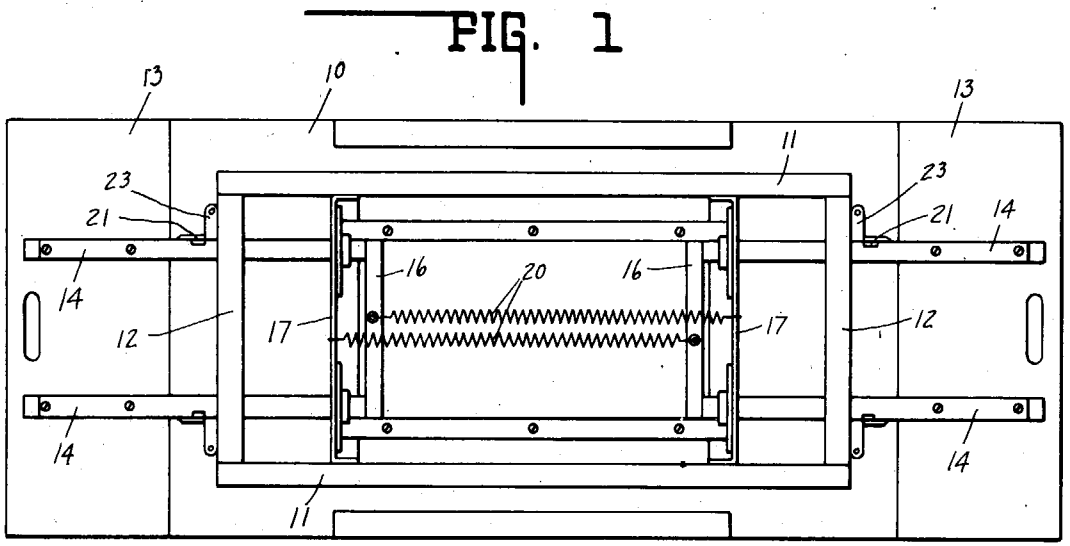
Figure 1 is a bottom plan view of one embodiment of the invention, the extension top sections being arranged in their outermost positions and in the same plane with the main top section.
Figure 7:
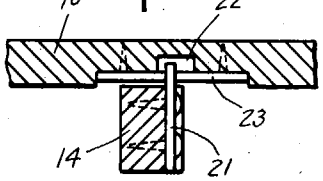
Figure 7 is a sectional view taken substantially on the line 7—7 of Figure 6.

Referring more in detail to the drawings it will be seen, that in the present or preferred form of the invention, the main top section 10 which may be of any conventional construction is shown as rectangular and is fixedly secured to an under supporting frame having sides 11 and ends 12. At each end of the table there is an open space between the under side of the top 10 and the upper edges of the sides 11 and 12; and at each end of the table there is an extension top section 13, whose length is substantially equal to the width of the top section 10, and each section 13 is, when not in use adapted to be arranged within the referred to space as shown in Figure 3.

To the under side of each top section 13 there are secured two bars 14, said bars 14 being relatively spaced, and passing through slots 15 in the ends 12, and at their inner ends being connected by a cross bar 16.

Adjacent each end member 12 of the frame, and in parallelism thereto, there is suitably mounted between the sides 11 a reinforcing bar 17, the same being preferably of metal and having a flanged upper edge suitably secured to the under side of the table top section 10 at 117 and sides 11 at 111. Bars 110 are suitably secured to member 17 and to the table 10 at 110*a*. Each bar 17 is provided with rimmed or flanged slots or openings 18 alining with the slots 15 in an adjacent frame 12; and through these slots 18 are slidable the inner ends of a pair of bars 14. Blocks 19 are secured to the under sides of the bars 14 adjacent the inner ends of said bars and said blocks 19 have beveled ends 19*a* to facilitate passage of the blocks 19 through the slots 18 when the top section 13 together with its bars 14 is moved outwardly beyond the end of the table. It is also apparent, that upon such outward movement of the sections 13, the blocks 19 passing into the slots 18 serve to elevate the sections 13.

The sections 13 are yieldably retained in their retracted positions, that is in position beneath the table top section 10 through the medium of coil springs 20, each coil spring being anchored at one end 120*a* to a bar 17 and at a relatively opposite end 120*b* to the cross bar 16 connecting that pair of bars 14 passing through the slots 18 of the other of said cross bar 17 as will be clear from a study of Figure 2.

Each bar 14 intermediate its ends has secured fixedly thereto at one side thereof a countersunk catch member 21, which catch member 21 is in the nature of a hook the shank of which is of flat plate like construction and is provided adjacent its upper end with a bill or extension adapted to be received in a groove 22 on the under side of the top section 10 and to move longitudinally of the groove in one direction to engage a keeper plate 23 countersunk as at 123 and secured at its ends by screws or other suitable fastening elements 24 to the under side of the top section 10 adjacent one end of the groove 22. With the hooks 21 so engaged with their respective plates 23 it will be seen that the tabletop section 13 will be supported from the main top section 10 in the same plane with said main top section, and in edge abutting relation therewith by means of the spring 20 or its equivalent.

Figure 6:
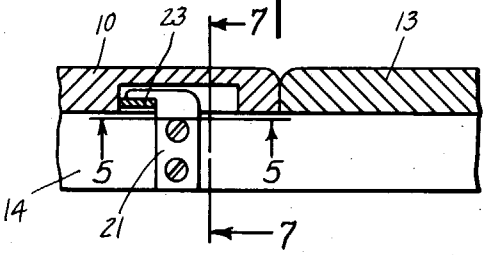
Figure 6 is a fragmentary sectional elevational view showing the inter-engaging means on the main top section and the extension top section for sustaining the latter section in the same plane with the main top section.

In actual practice, when the extensions 13 are not in use they are, as before stated, arranged beneath the table top section 10, being located in the spaces between the end portions of the table top section 10 and the upper edges of the sides 11 and 12. When it is desired to enlarge the table top at either or both ends, either or both of the sections 13 may be moved outwardly, respectively. In this connection it will be noted, that when initially moved outwardly the section 13 will move straight outwardly until the inclined faces 19a of blocks 19 come into contact with the rims at the lower portions of slots 18, whereupon the bars 14 will be elevated as the blocks 19 pass through the slots. When the section 13 has been moved outwardly beyond the end of the top section 10 in its elevated position, the section 13 is then moved backward until its inner edge engages the end edge of the section 10. Upon backward movement of the section 13, the hooks 21 whose upper ends, upon elevation of the bars 14 in the manner just explained, were projected into the grooves 22 will move into engagement with the plates 23 so that with the hooks 21 so engaged with the plates 23 as shown in Figure 6, the end section 13 will be secured in its extended position and in the same plane with the main top section 10. By reason of the spring 20 associated therewith, the section 13 will be yieldably held in edge abutting relation with the main top section 10 and thus possibility of the hooks 21 being disengaged from the plates 23 is reduced to a minimum.

To retract an extension 13, the same is drawn outwardly away from the section 10 and then under action of the spring 20 will be urged downwardly and drawn rearwardly into its nested position beneath the top section 10. Members 110 and 17 constitute an inner frame while sides 11 and ends 12 constitute an outer frame.

Even though I have herein shown and described the preferred embodiment of the invention, it is to be understood that I do not wish to limit myself to the precise details of construction, combination and arrangement of elements herein shown, but claim all such forms of the invention to which I am entitled in view of the requirements of the art and the scope of the appended claims.

Having thus described my invention, what I claim as new is:—

1. In an extension table, a main top, an under supporting frame therefor, and having sides and ends, spaced apart reinforcing bars extending between the sides of the frame, and respectively provided with relatively spaced, rimmed openings, and each end member of the frame having openings alined with the openings in a proximate reinforcing bar; pairs of sliding bars passing through the openings in the ends of the frame and reinforcing bars, a connecting bar connecting one end of each pair of sliding bars, an extension top section connected to the free ends of said pair of sliding bars, for sliding inward and outward movement therewith, there being an open space between each end frame member and an adjacent end of the main top, within which a top extension is adapted to be received, blocks attached to the inner ends of the sliding bars adapted to pass into the openings in the reinforcing bars on outward movement of the extension top sections to elevate said top sections, springs connecting the connecting bars with the reinforcing bars to urge the top sections when the latter are raised, inwardly into edge abutting relation with the main top, and into abutting relation with the reinforcing bars when the top sections are lowered, and inter-engaging means on the main top and on said sliding bars to hold the top sections in the same plane with the main top when the top sections are in edge abutting engagement with the main top.

2. In an extension table, a supporting frame, a main top rigidly secured thereto, there being an open space between an end portion of the frame and the top, a transverse reinforcing bar mounted in the frame and having relatively spaced openings, an extension top section, bars slidable through said openings and fixedly secured at one end to the said top section, blocks rigidly attached to the inner ends of the sliding bars adapted to engage in the openings when the bars and top section are moved outwardly beyond the end of the table to elevate the bars and top section, and inter-engaging means on the underside of the main top and on the sliding bars for holding the extension top section in the same plane with the main top when said sliding bars and top section, in elevated position, are moved backward to bring the top section in to edge abutting relation with the main top.

3. In an extension table, the combination with a main top and an extension top slide, of an outer frame with an open space therein and spaced at the end from said main top to provide a nesting space for the slide, an inner frame of quadrilateral form with an open space therein and secured to the main top and the outer frame, both openings being similarly directed and spaced bars rigid with and supporting the slide and slidable through notches in the end of the outer frame and operatively associated with the inner frame.

4. In an extension table, the combination with a main top and an extension top slide, of an outer frame with an open space therein and spaced at the end from said main top to provide a nesting space for the slide, an inner frame of quadrilateral form with an open space therein and secured to the main top and the outer frame, both openings being similarly directed, spaced bars rigid with and supporting the slide and slidable through notches in the end of the outer frame and operatively associated with the inner frame, and means connected to the inner frame opposite the slide associated portion thereof constraining the slide toward nested position.

5. In an extension table, the combination with a main top and an extension top slide, of an outer frame with an open space therein and spaced at the end from said main top to provide a nesting space for the slide, an inner frame of quadrilateral form with an open space therein and secured to the main top and the outer frame, both openings being similarly directed, spaced bars rigid with and supporting the slide and slidable through notches in the end of the outer frame and operatively associated with the inner frame, and means carried by a bar and the main top for sustaining the slide in aligned position and in main top alignment.

6. In an extension table, the combination with a main top and an extension top slide, of an outer frame with an open space therein and spaced at the end from said main top to provide a nesting space for the slide, an inner frame of quadrilateral form with an open space therein and secured to the main top and the outer frame, both openings being similarly directed, spaced bars rigid with and supporting the slide and slidable through notches in the end of the outer frame and operatively associated with the inner frame, means connected to the inner frame opposite the slide associated portion thereof constraining the slide toward nested position, and means carried by a bar and the main top for sustaining the slide in elevated position and in main top alignment and constrained by said constraining means to maintain such position and alignment.

7. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, spaced bars secured at one end to the extension top slide and to the underside thereof, and means tending to prevent separation of the extension top and the main top in the plane of the latter, of cooperative means carried by each of said bars and by the underside of said top, said cooperative means constituting the sole means for supporting the extension slide when in alignment with and abutting the main top irrespective of warpage in the latter.

8. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, spaced bars secured at one end to the extension top slide and to the underside thereof, and means tending to prevent separation of the extension top and the main top in the plane of the latter, of cooperative means carried by each of said bars and by the underside of said top, the end of said frame means being notched to slidably support said bars, the notching registering with the open space and permitting freedom of up and down movement of the bars when the extension top slide is fully projected from the nested position, said cooperating means constituting the sole means for supporting the extension when in alignment with and abutting the main top irrespective of warpage in the latter.

9. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, spaced bars secured at one end to the extension top slide and to the underside thereof, and means tending to prevent separation of the extension top and the main top in the plane of the latter, of cooperative means carried by each of said bars and by the underside of said top, said cooperative means constituting the sole means for supporting the extension slide when in alignment with and abutting the main top irrespective of warpage in the latter, each of said cooperating means including a plate countersunk into the underside of the table top, the latter in juxtaposition thereto being recessed for reception of another member of said cooperating means, said other member being nestingly mounted on said bar and projecting upwardly therefrom and longitudinally of the bar and oppositely from the extension top supported by the bar and terminating below the projection of the top plane of the extension top and including an undercut portion below the top of the bar supported member for engaging said plate.

10. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, spaced bars secured at one end to the extension top slide and to the underside thereof, and means tending to prevent separation of the extension top and the main top in the plane of the latter, of cooperative means carried by each of said bars and by the underside of said top, the end of said frame means being notched to slidably support said bars, the notching registering with the open space and permitting freedom of up and down movement of the bars when the extension top slide is fully projected from the nested position, said cooperating means constituting the sole means for supporting the extension when in alignment with and abutting the main top irrespective of warpage in the latter, each of said cooperating means including a plate countersunk into the underside of the table top, the latter in juxtaposition thereto being recessed for reception of another member of said cooperating means, said other member being nestingly mounted on said bar and projecting upwardly therefrom and longitudinally of the bar and oppositely from the extension top supported by the bar and terminating below the projection of the top plane of the extension top and including an undercut portion below the top of the bar supported member for engaging said plate.

11. In an extension table, the combination with a supporting frame means, a main top rigidly secured thereto, but providing an open space between an end portion of the frame and the top, an extension top slide nestable in the open space between the main top and frame and moveable outwardly and upwardly therefrom and thence rearwardly into alignment with the main top, and spaced bars secured at one end to the extension top slide and to the underside thereof, of cooperative means carried by each of said bars and by the underside of said top, said cooperative means constituting the sole means for supporting the extension slide when in alignment with and abutting the main top irrespective of warpage in the latter.

12. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, and spaced bars secured at one end to the extension top slide and to the underside thereof, of cooperative means carried by each of said bars and by the underside of said top, the end of said frame means being notched to slidably support said bars, the notching registering with the open space and permitting freedom of up and down movement of the bars when the extension top slide is fully projected from the nested position, said cooperating means constituting the sole means for supporting the extension when in alignment with and abutting the main top irrespective of warpage in the latter.

13. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, and spaced bars secured at one end to the extension top slide and to the underside thereof, of cooperative means carried by each of said bars and by the underside of said top, said cooperative means constituting the sole means for supporting the extension slide when in alignment with and abutting the main top irrespective of warpage in the latter, each of said cooperating means including a plate countersunk into the underside of the table top, the latter in juxtaposition thereto being recessed for reception of another member of said cooperating means, said other member being nestingly mounted on said bar and projecting upwardly therefrom and longitudinally of the bar and oppositely from the extension top supported by the bar and terminating below the projection of the top plane of the extension top and including an undercut portion below the top of the bar supported member for engaging said plate.

14. In an extension table, the combination with a supporting frame means, a main top rigidly secured thereto, but providing an open space between an end portion of the frame and the top, an extension top slide nestable in the open space between the main top and frame and movable outwardly and upwardly therefrom and thence rearwardly into alignment with the main top, and spaced bars secured at one end to the extension top slide and to the underside thereof, of cooperative means carried by each of said bars and by the underside of said top, the end of said frame means being notched to slidably support said bars, the notching registering with the open space and permitting freedom of up and down movement of the bars when the extension top slide is fully projected from the nested position, said cooperating means constituting the sole means for supporting the extension when in alignment with and abutting the main top irrespective of warpage in the latter, each of said cooperating means including a plate countersunk into the underside of the table top, the latter in juxtaposition thereto being recessed for reception of another member of said cooperating means, said other member being nestingly mounted on said bar and projecting upwardly therefrom and longitudinally of the bar and oppositely from the extension top supported by the bar and terminating below the projection of the top plane of the extension top and including an undercut portion below the top of the bar supported member for engaging said plate.

CHARLES L. CREECH, JR.